United States Patent [19]

Bischoff et al.

[11] Patent Number: 4,959,856

[45] Date of Patent: Sep. 25, 1990

[54] AUTOMATIC ADMINISTRATION OF A TELECOMMUNICATION SYSTEM

[75] Inventors: Raymond B. Bischoff, Westminster; Norman C. Chan, Louisville, both of Colo.

[73] Assignee: AT&T Bell Laboratories, Murray Hill, N.J.

[21] Appl. No.: 347,551

[22] Filed: May 4, 1989

[51] Int. Cl.⁵ .............................................. H04M 3/00
[52] U.S. Cl. ................................... 379/245; 379/246; 379/258
[58] Field of Search ............... 379/201, 210, 211, 212, 379/213, 214, 245, 246, 258; 370/95.1, 85.7, 92

[56] References Cited

U.S. PATENT DOCUMENTS 4,755,985  7/1988  Jayapalon et al. .............. 379/245 X
4,763,354  8/1988  Fukushima et al. ............ 379/166 X

OTHER PUBLICATIONS

Integrated Services Network-Meridian SL-1-Features and Services Description for Generic X11, Northern Telecom, Practice 553-2311-105 (10-15-87) pp. i & 2-32 to 2-33.

AT&T System 85, Release 2, Versions 1, 2, and 3 Features Reference Manual, AT&T Document No. 555-10-2-301 (4-86) pp. 24-1 to 25-7.

Primary Examiner—James L. Dwyer
Attorney, Agent, or Firm—David Volejnicek

[57] ABSTRACT

Administration of a communication system having a plurality of addressable communication ports is accomplished automatically, by the system itself. The system is initially provisioned only with unlinked terminal translations. Establishment of hardware translations and their linking to the terminal translations is accomplished by the system automatically, in response to initial calls from system users. Each one of these initial calls informs the system of the call-originating terminals's extension, and thereby specifies to the system the requisite information for linking the originating extension and terminal translation with the call's incoming port. Station moves are also accomplished automatically, through similar calls.

43 Claims, 4 Drawing Sheets

AUTOMATIC ADMINISTRATION OF A TELECOMMUNICATION SYSTEM

TECHNICAL FIELD

The invention relates to communication systems in general, and particularly relates to the administration of telecommunication systems.

BACKGROUND OF THE INVENTION

The administration of a telecommunication system involves providing the system with information that (a) specifies, for each extension, the system port to which the extension is assigned, and (b) describes service features associated with that extension. The former information is conventionally referred to as a "hardware translation," while the latter information is commonly referred to as a "software translation" or a "terminal translation." The terminal translation typically specifies the name of the user to whom the extension is assigned, the class(es) of service and the class(es) of restriction to which the extension is entitled, and the feature information about the user's terminal equipment (e.g., does the terminal equipment communicate voice or data, does it use multifrequency or message signaling, does it have a "send-all-calls" feature button, etc.) Creating an association, or correspondence, between a terminal translation and a system port is referred to as "linking" or "hardware/software merging."

The system administration, done at system initialization, i.e., when the system is first being provided with the translations, is referred to as "provisioning." Linking is typically done as part of provisioning. Subsequent changes made in the hardware translation are referred to as "station moves." Station moves typically involve changes in linking.

Conventionally, provisioning is accomplished as follows: The communication system vendor's personnel determine the customer's needs, and on the basis thereof specify the system hardware and the terminal translations required by the customer. Upon customer approval of the specifications, the terminal translations, and an order for the hardware, are sent to the vendor's or vendor's supplier's factory.

In one scenario, the factory builds the system, links the terminal translations with the system ports, and provisions the system with the linked translations. The customer's building is then wired accordingly. Also, when the system is delivered to the customer's premises, the building wiring is connected to the system in a manner that corresponds to the linked translations.

Alternatively, the factory builds and supplies the system unprovisioned. The building is wired and then connected to the system in any desired manner, thereby defining the linking between system ports and terminal translations. The linking is then specified based on the actual connections, and the system is provisioned with linked translations. The linking and provisioning task is typically done by a qualified system administrator from an administrative console in a serial manner—one extension at a time.

Once the connections to the system are made and the system is provisioned, modifications are made in the connections and to the linked translations to effect changes requested by the customer and to correct errors. Also, the installation personnel run tests to make sure that each terminal is connected to the correct port and that each port is linked with the correct terminal translation, i.e., that the actual wiring matches the provisioned linked translations. Subsequent station moves are accomplished in the same manner.

As the above discussion shows, system administration is a time-and-labor-intensive process. Administrative activities must be performed in proper order, i.e., sequentially, and by skilled personnel. The whole process is susceptible to errors, e.g., miswiring. And implementation of customer changes requested since the order for the system was placed may require significant system reconfiguration, and typically is a further source of errors. Minimization and elimination of errors in turn require the existence and use of provisioning support tools and testing procedures, which are costly in time or money.

SUMMARY OF THE INVENTION

This invention is directed to solving this and other problems of the prior art. Illustratively according to the invention, a communication system is initially provisioned with unlinked terminal translations, and the linking of terminal translations to ports is accomplished by the system automatically, in response to initial calls—illustratively made by the users themselves—each one of which calls informs the system of the call-originating terminal's extension, and thereby specifies to the system the requisite information for linking the terminal translation of the originating terminal—and hence also its extension—with the call's incoming port. Station moves are also accomplished automatically, through similar calls. Generally according to the invention, in an apparatus, such as a communication switch, that comprises a plurality of addressable ports, linking of an address—such as an extension number—to a port is accomplished by the apparatus automatically: the system receives an address at one of its ports, and responds by assigning the received address to the port at which the address was received. The port is henceforth addressable by, i.e., accessible via, this address. This process is repeated for each linking that needs to be accomplished. To effect a station move, the system receives a predetermined signal at one of its ports that has an assigned address, and responds by freeing the assigned address from its assignment to the one port, thereby unlinking the address from the port. Alternatively, the system receives a predetermined signal and an assigned address at any one of its ports, and responds by freeing the assigned address from its assignment to whichever port it is actually assigned to. A new linking is then established in the manner characterized above.

The invention offers numerous advantages. Provisioning of the system with unlinked terminal translations may be done at the factory, thereby avoiding the need to do so in the field using an expert administrator and a serial process. Wiring of the customer's building and connection thereof to the switching system may be done without concern for, and independent of, linking, and hence may be done substantially arbitrarily. (Substantially the only remaining concerns affecting connection of the building wiring to the switch are that the correct type of port must be connected to each line, i.e., analog to analog and digital to digital, and that distribution of line connections among port circuit boards is needed to reduce load balance problems). Because provisioning and wiring may be done independently of each other, they may be done in parallel as opposed to sequentially, thereby saving time between the placing of the order for the system and completion of system installation. And because provisioning and wiring are independent of each other, there is less opportunity for miswiring the lines to the switch. Furthermore, customer changes in the location of extensions (i.e., changes in which line is associated with which extension) during the manufacture, delivery, and installation of the system have no present effect on the system, and hence require no changes in either translations or connections to be made. Consequently, these changes do not contribute to errors, nor is any time or effort required to physically effect them. Because the system performs linking automatically and based on the actual system configuration, neither provisioning tools to effect the linking, nor tests to determine whether wiring actually corresponds to the linking, are required. And because linking is effected by the mere placing of a call, provisioning and station moves may be completed by the users themselves without intervention from a system administrator. All of these advantages result in a communication system that can be built, delivered, installed, and put to use faster yet at a lower cost than conventional systems, and that can be reconfigured by the system users themselves without assistance from a system administrator.

These and other features and advantages of the invention will become more apparent from the following description of an illustrative embodiment of the invention considered together with the drawing.

DETAILED DESCRIPTION

Figure 1:
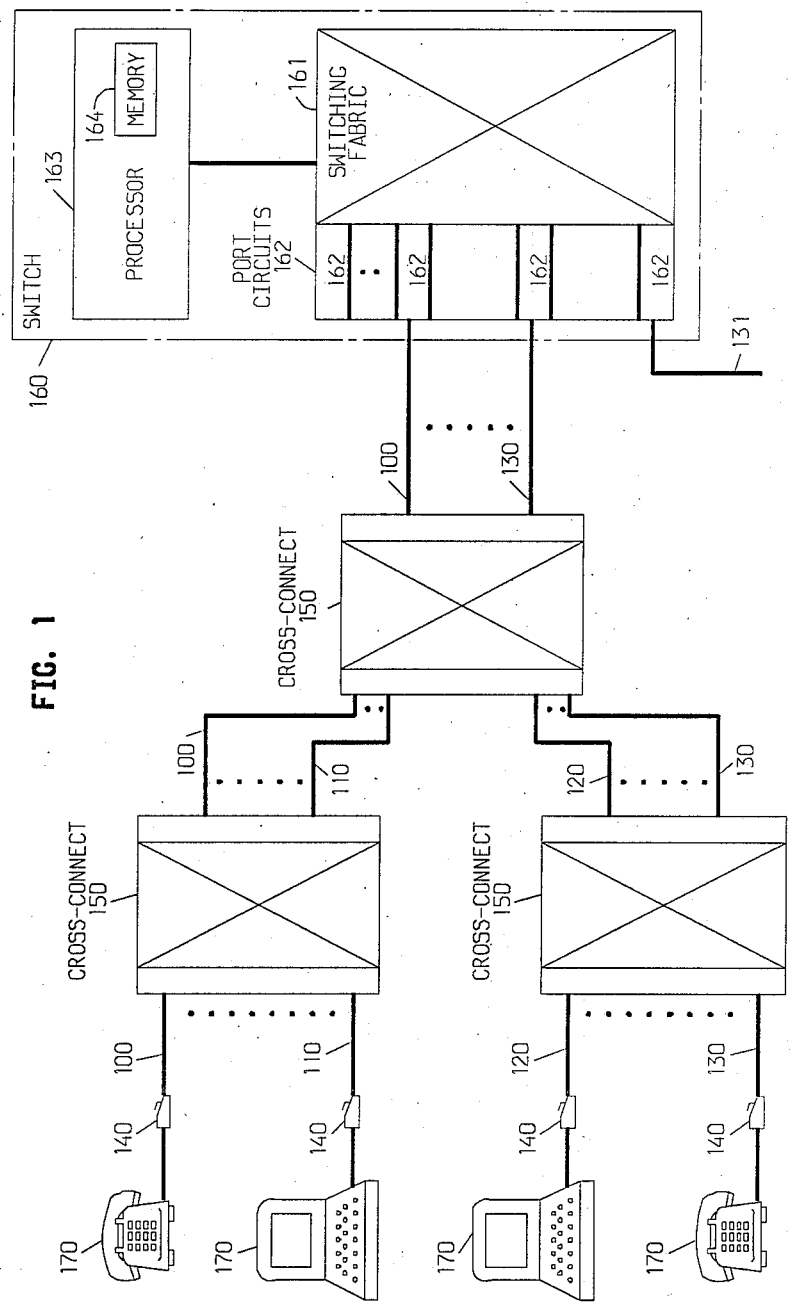
FIG. 1 is a block diagram of an illustrative communication system which uses an illustrative example of the invention.

FIG. 1 shows an illustrative private telephone communication system. It includes a plurality of phone jacks 140 that are physically located in various places (e.g., in various rooms) on the premises of the communications system owner. Various types of stations or terminals 170—such as analog and digital telephone station sets, data terminals, and personal computers equipped with modems or AT&T PC/PBX circuit cards—are plugged into jacks 140. Each jack 140 is connected by a different one of a plurality of phone lines 100-130 through crossconnects 150 to a switch 160. Switch 160 is a private branch exchange (PBX) such as an AT&T Definity TM or System 75 or 85. Switch 160 includes a conventional switching fabric 161, a processor 163—including a memory 164—for controlling switching fabric 161, and a plurality of conventional port circuits, or ports, 162 for interfacing switching fabric 161 to phone lines 100-130 and to trunks 131 that connect switch 160 to other switches.

Figure 2:
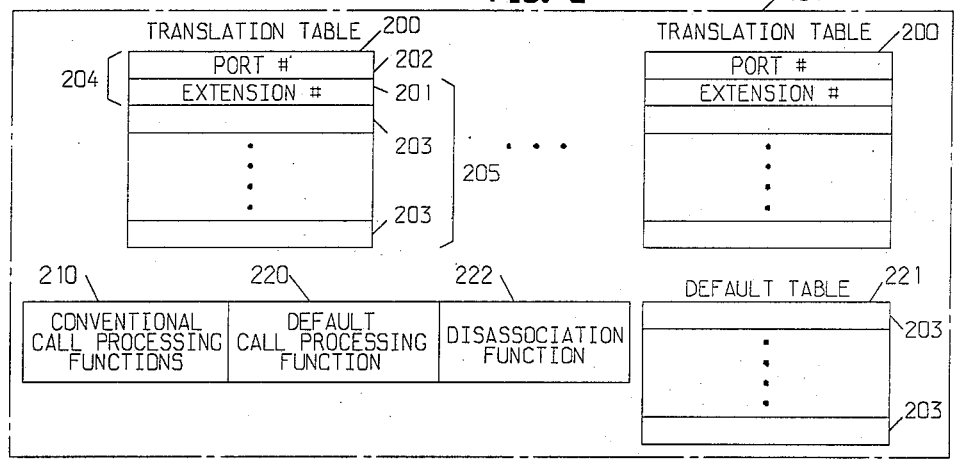
FIG. 2 is a block diagram of contents of the memory of the system of FIG. 1.

Turning to FIG. 2, memory 164 of processor 163 of switch 160 includes a plurality of translation tables 200. Tables 200 are used to represent translations—both hardware translations 204 and terminal translations 205—for extension numbers of the communication system of FIG. 1. There is one table 200 for each active extension number. A table 200 includes an entry 201 for storing the extension number to which it corresponds. It also includes an entry 202 for storing the identity—the number—of the one of the ports 162 to which the extension number is assigned. Entries 201 and 202 together form a hardware translation 204. A table 200 further includes a plurality of entries 203 for storing information that specifies the service features that are assigned to the extension number. These include both the class-of-service and class-of-restriction to which the extension number is assigned, as well as functional features of the terminal 170 that is to be connected to the one of the lines 100-130 with which the extension number is associated. Entries 201 and 203 together form a terminal translation 205. A hardware translation 204 and a terminal translation 205 are linked by being included within the same table 200 and sharing entry 201. As shown and described so far, the communication system of FIG. 1 is conventional.

According to the invention, switch 160 is shipped to the customer and installed on the customer's premises with entries 201 and 203 of tables 200 filled in with the requisite information, but with entries 202 left empty of information. In other words, switch 160 is shipped and installed provisioned with terminal translations 205, but unprovisioned with hardware translations 204, and hence the extension numbers are not linked to ports 162 and lines 100-130 at this time. Unlike a conventional switch which has software that would prevent a table 200 from having translation 205 filled with information without entry 202 also being filled, i.e., software that would prevent the storage of unlinked translations in memory 164, switch 160 explicitly permits translation 205 to be filled with information without entry 202 also being filled.

Further according to the invention, the customer's premises are wired with phone lines 100-130 prior to installation of switch 160 and independently of linking. This makes orderly wiring possible. Upon installation of switch 160, lines 100-130 are connected to ports 162 also independently of linking, attention being paid only to connecting the correct type of port 162 to each line 100-130 (i.e., analog port to analog terminal line, digital port to digital terminal line, etc). Additionally, care may be taken to distribute the line connections among port 162 circuit packs to reduce circuit pack load balance problems. The connections between lines 100-130 and ports 162 define the linking between extensions and ports 162, as well as the linking or association between the extensions and lines 100-130. This condition is used by users and switch 160 to define hardware translations 204 and to actually link the hardware translations 204 with software translations 205, in the following manner.

Figure 3:
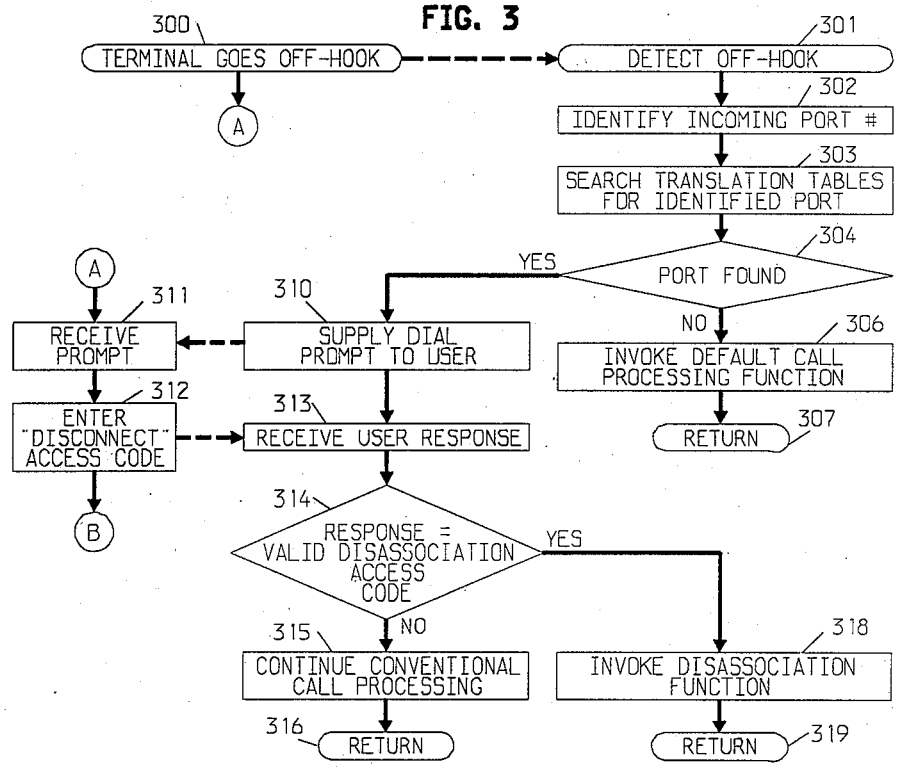
FIG. 3 is a flow diagram of modified actions of the conventional call-processing functions of FIG. 2, and of user interactions therewith.

Memory 164 of processor 163 of switch 160 includes modified but conventional call-processing functions 210, a default call-processing function 220, and a disassociation function 222, as shown in FIG. 2. Operations of call-processing functions 210 that are relevant to an understanding of this invention are shown in FIG. 3.

At system initialization, switch 160 and all of its ports 162 are powered up. Switch 160 is enabled thereby to detect, and to respond to, an "off-hook" signal incoming on any line 100-130 to a port 162, in a conventional manner.

Each system user is given a telephone extension number. Each user connects his or her terminal 170 to jack 140 of the one of the lines 100-130 with which he or she wants his or her assigned extension number to become associated. To cause a hardware translation 204 to be defined and linked to a software translation 205 by switch 160 for his or her extension number, a user first establishes a communication connection to switch 160 by taking his or her terminal 170 off-hook, as shown by step 300 of FIG. 3. This condition is detected at switch 160 by functions 210, at step 301. Functions 210 respond thereto by identifying the one of the ports 162 at which the off-hook condition was detected, at step 302. Functions 210 then search entries 202 of tables 200 for the number of the identified port 162, at step 303. If the number of the identified port 162 is found in entry 202 of a table 200, at step 304, this means that a hardware translation 204 for the extension number corresponding to this table 200 has already previously been defined and linked to a software translation 205, and hence calls may be made to and from this extension number. Consequently, functions 210 continue conventional call-processing activities, at steps 310 et. seq., and thereafter return to the point of their invocation, at step 316.

If the number of the port 162 identified at step 302 is not found by functions 210 in entry 202 of any table 200, at step 304, this means that the port 162 has not yet been assigned to an extension number. Conventionally, this would mean that calls cannot be made using this port 162 and hence the off-hook signal detected at this port 162 would simply be ignored by functions 210. However, according to this invention, a call can be made using this port 162, but only a "default" call to prompt switch 160 to establish and link a hardware translation 204 for this port 162. Hence, instead of ignoring the off-hook signal, functions 210 invoke default call-processing function 220, at step 306, and then return to the point of their own invocation, at step 307. The number of the port 162 identified at step 302 is passed to function 220 as a parameter upon its invocation.

Figure 4:
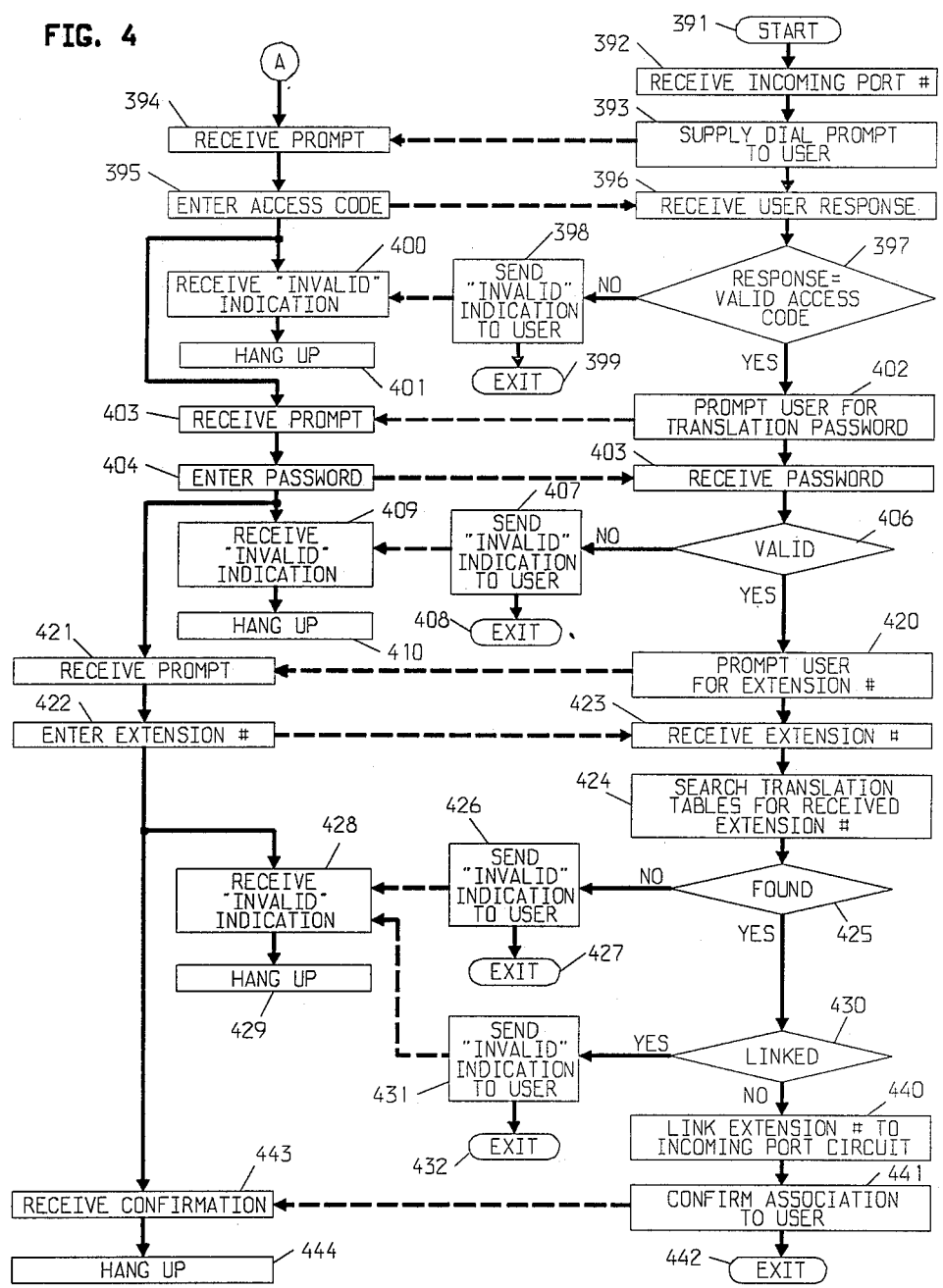
FIG. 4 is a flow diagram of the actions of the default call-processing functions of FIG. 2, and of user interactions therewith.

The activities performed by function 220 are shown in FIG. 4. Function 220 may perform these activities either automatically or in response to accessing an optional default translation table 221 in memory 164 (see FIG. 2) and determining therefrom actions that it should undertake. Table 221 is different from tables 200 in that it does not have entries 201 and 202—it is automatically associated with all ports 162 that are not identified by entries 202 of tables 200.

When function 220 starts executing in response to being invoked, at step 391, it receives the number of port 162 that was passed to it as a parameter, at step 392, and then sends a dial prompt (e.g., a dial tome) to the user via the incoming port 162, at step 393, as for a conventional call.

The user receives the dial prompt, at step 394, and in response enters a provisioning access code, at step 395. The code may be any predetermined code. Its purpose is to indicate to function 220 that the user intends to provision the system for his or her terminal.

Function 220 receives the user's response to the dial prompt, at step 396, and checks whether it is the valid provisioning access code, at step 397. If it is not the proper code, function 220 sends an "invalid" indication to the user via the incoming port 162, at step 398, and then exits, at step 399. The "invalid" indication is illustratively either an intercept tone, or a recorded announcement informing the user that the access code is invalid, and asking the user to please hang up and try again or contact the system administrator for assistance.

The user receives the "invalid" indication, at step 400, and in response hangs up the terminal, at step 401. The user can now return to step 300 (see FIG. 3) to try again.

If the entered access code is found to be valid, at step 397, function 220 then sends a prompt via the incoming port 162 to cause the user of the off-hook terminal to enter a translation password, at step 402. The prompt can be a signal such as dial tone, or a recorded message inviting the user to enter the password. The password may be any predetermined password. All users of the system may use a common password, or each user may have a separate password. The purpose of entering the password is twofold: it indicates that the user intends by this call to define and link a hardware translation, and it also indicates that this is a user who is authorized to do so.

The user receives the prompt, at step 403, and in response thereto enters the password, at step 404.

Function 220 receives the password, at step 405, and checks whether it is valid, at step 406. If it is not valid, function 220 sends the "invalid" indication to the user via the port 162, at step 407, and then exits, at step 408.

The user receives the "invalid" indication, at step 409, and in response hangs up the terminal, at step 410. The user can now return to step 300 (see FIG. 3) to try again.

If the entered password is found to be valid at step 406, function 220 sends a prompt via the port 162 to cause the user to enter the extension number of the off-hook terminal, at step 420. Again, the prompt can be a signal such as a dial tone, or a recorded message inviting the user to enter his or her extension number.

The user receives the prompt, at step 421, and in response thereto enters an extension number, at step 422.

Function 220 receives the entered extension number, at step 423, and then searches entries 201 of translation tables 200 (see FIG. 2) for this extension number, at step 424. If function 220 does not find the extension number in a table 200, at step 425, it sends an "invalid" indication to the user via the port 162, at step 426, and then exits, at step 427. The "invalid" indication is illustratively again either an intercept tone, or a recorded announcement informing the user that the extension number is invalid, and to please hang up and try again or contact the system administrator for assistance.

The user receives the "invalid" indication, at step 428, and in response hangs up the terminal, at step 429.

If function 220 does find the extension number in a table 200, at step 425, it checks whether that number is already linked to a port 162, i.e., whether entry 202 of that table 200 already stores the number of a port 162, at step 430. If so, function 220 sends an "invalid" indication to the user via port 162, at step 431, and then exits, at step 432. The "invalid" indication is once again either an intercept tone, or a recorded announcement informing the user that the extension number is already linked to a port 162.

The user receives the "invalid" indication, at step 428, and in response hangs up the terminal, at step 429.

If function 220 finds at step 430 that the received extension number is not linked to a port 162, it links the extension number to the port 162 via which the extension number was received, at step 440, by storing the number of the port 162 in entry 202 of the table 200 in which the extension number is found stored in entry 201. By this action, hardware translation 204 is created and linked to terminal translation 205 in that extension's translation table 200, and the extension number henceforth serves as an address of the port 162 with which it is linked. Function 220 then sends a confirmation of the association to the user via the port 162, at step 441, and exits at step 442. The confirmation illustratively takes the form of a confirmation tone or a recorded announcement stating that the user's terminal is now activated and assigned to the received extension number. In the case of the recorded announcement, speech synthesis equipment may be used to vocalize and return to the user the received extension number, as well as the name of the user (stored in an entry 203 of table 200) to whom the number is assigned, as a means of assuring the user that switch 160 has been provisioned properly.

The user receives the confirmation, at step 443, and hangs up the terminal, at step 444. Provisioning for that extension number is completed thereby. The process is repeated for each individual extension number.

Once provisioning has been completed for an extension, conventional calls can be placed to and from that extension number. However, because extension numbers are not provisioned all at the same time, it may happen that a call is placed to an as-yet unprovisioned extension number. Such a call could be placed either directly, by the calling party dialing the unprovisioned extension number, or indirectly, through a feature—such as call-forwarding or pickup—of a provisioned extension number. In either case, the call originator is either provided with a busy indication by call-processing functions 210, or is otherwise treated as if that destination terminal were busy or off-hook. This could include further call-forwarding to another active terminal.

To effect a station move, i.e., to change the association of his or her extension from one line 100–130 to another, a user first breaks the presently-existing association and then creates a new association.

Figure 5:
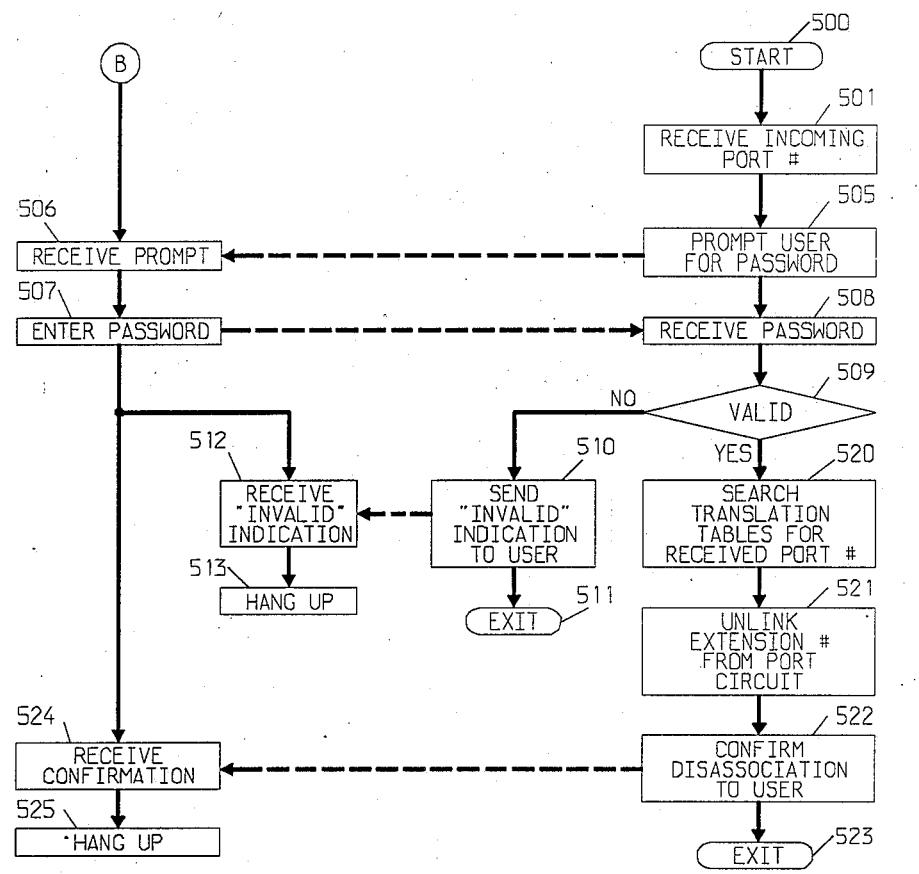
FIG. 5 is a flow diagram of the actions of the disassociation function of FIG. 2, and of user interactions therewith.

The activities undertaken to break a presently-existing association are shown in FIGS. 3 and 5. The user first takes his or her terminal off-hook, as shown by step 300 of FIG. 3. The response of functions 210 thereto are as shown in steps 301–304 and described above. Because an association between an extension number and the incoming port 162 exists, the number of the incoming port 162 is found in an entry 202 of a translation table 200 at step 304. Functions 210 respond thereto by supplying a dial prompt (e.g., a dial tone) to the user, at step 310, as for a conventional call.

The user receives the dial prompt, at step 311, and in response enters a disassociation access code, at step 312. The code may be any predetermined code other than a valid extension number.

Functions 210 receive the user's response to the dial prompt, at step 313, and check whether it is a valid disassociation access code, at step 314. If not, for example if it is an extension number, functions 210 treat the call as a conventional call, and continue conventional call-processing activities, at step 315. But if the response received at step 313 is found at step 314 to be a valid disassociation access code, functions 210 invoke disassociation function 222, at step 318, and then return to the point of their own invocation, at step 319. The number of the port 162 identified at step 302 is passed to function 222 as a parameter upon its invocation.

The activities performed by function 222 are shown in FIG. 5. When function 222 starts executing in response to being invoked, at step 500, it receives the number of the incoming port 162 that was passed to it as a parameter, at step 501, and then prompts the user for a password, at step 505. The requisite password may be the same as that prompted for in step 402 of FIG. 4. The user response to the prompt, and the treatment given by function 222 to the user response, are the same as shown in steps 404–410 of FIG. 4, at step 506–513. However, if the password is found to be valid at step 509, function 222 searches entries 202 of translation tables 200 for the port number of the incoming port 162, at step 520, and upon finding it, function 222 unlinks and disassociates the user's extension number from the incoming port 162, at step 521, by clearing that table's entry 202 of the port number of the incoming port 162. Function 222 then sends a confirmation of the disassociation to the user, at step 522, and exits, at step 523. Confirmation illustratively takes the form of a confirmation tone or a recorded announcement.

The user receives the confirmation, at step 524, and hangs up, at step 525.

Alternatively, the user who is breaking a presently-existing association need not be restricted to placing the call through the port 162 whose association with an extension number is being broken, but may place the call through another port 162. In this alternative implementation, prior to step 520, function 222 prompts the user for the extension number that is to be disassociated and then at step 520 function 222 searches entries 201 of translation tables 200 for the received extension numbers and not for the incoming port number.

To now create a new association between his or her extension number and a port 162, the user disconnects his or her terminal 170 from jack 140 to which it is presently connected, connects the terminal 170 to jack 140 of the one of the lines 100–130 with which he or she wants to associates his or her extension number, and performs again the same activities of FIGS. 3 and 4 as he or she performed at system provisioning. The response of switch 160 to these activities is also the same as at provisioning and shown in FIGS. 3 and 4.

Of course, it should be understood that various changes and modifications to the illustrative embodiment described above will be apparent to those skilled in the art. For example, a port 162 need not be a physical port but may instead be a logical port. A logical port may encompass a plurality of physical ports, and hence the same extension may be assigned to a plurality of ports and connected lines, such as those in a hunt group. Alternatively, a physical port may encompass a plurality of logical ports, such that each logical port represents a different time slot or frequency on the connected link in a time-division or a frequency-division switch. Also, the users need not physically dial, key in, or otherwise enter their extensions on their terminals to provide them to the switch automatically. Furthermore, certain entries 203 of tables 200 may be associated not with the terminal to whom the extension number stored in entry 201 is assigned, but with the port 162 whose number is stored in entry 202. In that case, these port-specific entries 203 of table 200 are filled with valid information only when the entry 202 of table 200 is filled with the corresponding port number at provisioning, and are moved from one table 200 to another along with the corresponding port number at the time of a station move. Such changes and modifications can be made without departing from the spirit and the scope of the invention and without dismissing its attendant advantages. It is therefore intended that all such changes and modifications be covered by the following claims.

We claim:

1. An apparatus comprising:
   a plurality of communication ports each addressable by an extension number; and
   means responsive to receipt of an extension number at an individual one of the ports for assigning the received extension number to serve as an address of the one port.

2. The apparatus of claim 1 wherein the assigning means include:
   means for determining whether a port has an extension number assigned thereto; and
   means responsive to receipt of an extension number at an individual one of the ports and a determination by the determining means that the one port does not have an extension number assigned thereto, for assigning the received extension number to the one port.

3. The apparatus of claim 1 further comprising
   means responsive to receipt of a predetermined signal at an individual one of the ports having an assigned extension number, for freeing the extension number from its assignment to the one port.

4. The apparatus of claim 1 wherein
   the assigning means include:
   means responsive to a first signal received at an individual one of the ports, for determining whether the one port has an extension number assigned thereto;
   means responsive to a determination that the one port does not have an extension number assigned thereto, for sending a second signal from the one port to elicit supplying of an extension number for the one port to the apparatus; and
   means responsive to receipt at the one port of an extension number elicited by the second signal, for assigning the received extension number to the one port.

5. The apparatus of claim 4 wherein the assigning means further include:
   means responsive to a determination that the one port has an extension number assigned thereto, for sending a third signal from the one port to elicit supplying of a response signal to the apparatus;
   means responsive to receipt at the one port of the response signal, for determining whether the response signal is a predetermined signal; and
   means responsive to a determination that the response signal is the predetermined signal, for freeing the extension number assigned to the one port from the assignment to the one port.

6. The method of claim 4 wherein the step of assigning further includes the steps of:
   sending a third signal from the one port to elicit supplying of a response signal, in response to a determination that the one port has an extension number assigned thereto;
   determining whether the response signal is a predetermined signal, in response to receipt at the one port of the response signal; and
   freeing the extension number assigned to the one port from assignment to the one port, in response to a determination that the response signal is the predetermined signal.

7. A communication switch comprising:
   a plurality of communication ports addressable by extension numbers and for interfacing communication lines to the switch;
   means for switching communications among the plurality of ports in response to communication destination extension numbers;
   memory means for storing a plurality of translation tables each associated with and addressed by a different extension number and having an entry for identifying a port to which the associated extension number is presently assigned; and
   means responsive to receipt of an extension number at an individual one of the ports, for causing the entry of the translation table associated with the received extension number to identify the one port.

8. The apparatus of claim 7 further comprising:
   means responsive to receipt of a predetermined signal at an individual one of the ports having an assigned extension number, for causing the entry of the translation table associated with the assigned extension number to cease identifying a port.

9. The apparatus of claim 7 wherein
   the entry-causing means include:
   means responsive to a first signal received at an individual one of the ports, for determining whether the entry of any of the translation tables identifies the one port;
   means responsive to a determination that the entry of none of the translation tables identifies the one port, for sending a second signal from the one port to elicit supplying of an extension number for the one port to the apparatus;
   means responsive to receipt at the one port of an extension number elicited by the second signal, for determining whether a translation table is associated with the received extension number; and
   means responsive to a determination that a translation table is associated with the received extension number, for causing the entry of the translation table associated with the received extension number to identify the one port.

10. The apparatus of claim 9 wherein
    the entry-causing means further include:
    means responsive to the entry of the translation table being caused to identify the one port, for sending a third signal from the one port to confirm assignment of the received extension number to the one port.

11. The apparatus of claim 9 wherein
    the means for sending a second signal comprise:
    means responsive to a determination that the entry of none of the translation tables identifies the one port, for sending a third signal from the one port to elicit supplying of a password to the apparatus;
    means responsive to receipt of a password elicited by the third signal, for determining whether the received password is valid; and
    means responsive to a determination that the received password is valid, for sending the second signal from the one port to elicit supplying of an extension number for the one port to the apparatus.

12. The apparatus of claim 9 wherein
    the entry-causing means further include:
    means responsive to a determination that the entry of a translation table identifies the one port, for sending a third signal from the one port to elicit supplying of a response signal to the apparatus;

means responsive to receipt at the one port of the response signal, for determining whether the response signal is a predetermined signal; and means responsive to a determination that the response signal is the predetermined signal, for causing the entry of the translation table that identifies the one port to cease identifying the one port.

13. A method of assigning an extension number to a communication port of an apparatus having a plurality of communication ports each addressable by an extension number, comprising the steps of:

receiving an extension number at an individual one of the ports; and assigning the received extension number to serve as an address of the one port, in response to receiving the extension number.

14. The method of claim 13 wherein the step of assigning includes the steps of:

determining whether the one port has an extension number assigned thereto; and assigning the received extension number to the one port, in response to a determination that the one port does not have an extension number assigned thereto.

15. The method of claim 13 further comprising the step of freeing the extension number from its assignment to the one port, in response to receipt of a predetermined signal at the one port having the assigned extension number.

16. The method of claim 13 wherein the step of assigning includes the steps of:

determining whether the one port has an extension number assigned thereto, in response to a first signal received at the one port;

sending a second signal from the one port to elicit supplying of an extension number for the one port, in response to a determination that the one port does not have an extension number assigned thereto; and assigning an extension number elicited by the second signal to the one port, in response to receipt at the one port of the elicited extension number.

17. A method of assigning an extension number to a communication port of an apparatus having a plurality of communication ports each addressable by an extension number, comprising the steps of:

establishing a communication connection to the system through an individual one of the ports;

sending an extension number that is to be assigned to the one port via the communication connection to the system;

receiving the sent extension number at the one port; and assigning the received extension number to serve as the address of the one port, in response to receipt of the extension number at the one port.

18. A method of assigning an extension number to a port of a communication apparatus having a plurality of ports, comprising the steps of:

initiating a call to the apparatus from a terminal connected to an individual one of the ports that does not have an extension number assigned thereto;

in response to receipt of a prompt from the apparatus at the terminal via the initiated call, supplying the apparatus with the extension number from the terminal via the initiated call, to cause the apparatus to assign the extension number to the one port; and terminating the call.

19. The method of claim 18 further comprising the steps of:

initiating a second call to the apparatus from a terminal connected to an individual one of the ports that has an extension number assigned thereto;

in response to receipt of a prompt from the apparatus at the terminal via the initiated second call, supplying the apparatus from the terminal via the initiated second call with a signal to cause the apparatus to free the assigned extension number from the assignment to the one port; and terminating the second call.

20. The method of claim 18 further comprising the steps of:

initiating a second call to the apparatus from a terminal connected to a port;

in response to receipt of a prompt from the apparatus at the terminal via the initiated second call, supplying the apparatus from the terminal via the initiated second call with both an extension number that is assigned to an individual one of the ports and a signal to cause the apparatus to free the assigned extension number from the assignment to the one port; and terminating the second call.

21. An apparatus comprising:

a plurality of addressable communication ports;

means responsive to a first signal received at an individual one of the ports, for determining whether the one port has an address assigned thereto;

means responsive to a determination that the one port does not have an address assigned thereto, for sending a second signal from the one port to elicit supplying of an address for the one port to the apparatus;

means responsive to receipt at the one port of an address elicited by the second signal, for assigning the received address to the one port;

means responsive to a determination that the one port has an address assigned thereto, for sending a third signal from the one port to elicit supplying of a response signal to the apparatus;

means responsive to receipt at the one port of the response signal, for determining whether the response signal is a predetermined signal; and means responsive to a determination that the response signal is the predetermined signal, for freeing the address assigned to the one port from the assignment to the one port.

22. A communication switch comprising:

a plurality of addressable communication ports for interfacing communication lines to the switch;

means for switching communications among the plurality of ports in response to communication destination addresses;

memory means for storing a plurality of translation tables each associated with a different address and having an entry for identifying a port to which the associated address is assigned;

means responsive to a first signal received at an individual one of the ports, for determining whether the entry of any of the translation tables identifies the one port;

means responsive to a determination that the entry of none of the translation tables identifies the one port, for sending a second signal from the one port to elicit supplying of an address for the one port to the apparatus;

means responsive to receipt at the one port of an address elicited by the second signal, for determining whether a translation table is associated with the received address; and means responsive to a determination that a translation table is associated with the received address, for causing the entry of the translation table associated with the received address to identify the one port.

23. The apparatus of claim 22 wherein
the entry-causing means further include:
means responsive to the entry of the translation table being caused to identify the one port, for sending a third signal from the one port to confirm assignment of the received address to the one port.

24. The apparatus of claim 22 wherein
the means for sending a second signal comprise:
means responsive to a determination that the entry of none of the translation tables identifies the one port, for sending a third signal from the one port to elicit supplying of a password to the apparatus;

means responsive to receipt of a password elicited by the third signal, for determining whether the received password is valid; and means responsive to a determination that the received password is valid, for sending the second signal from the one port to elicit supplying of an address for the one port to the apparatus.

25. The apparatus of claim 22 wherein
the entry-causing means further include:
means responsive to a determination that the entry of a translation table identifies the one port, for sending a third signal from the one port to elicit supplying of a response signal to the apparatus;

means responsive to receipt at the one port of the response signal, for determining whether the response signal is a predetermined signal; and means responsive to a determination that the response signal is the predetermined signal, for causing the entry of the translation table that identifies the one port to cease identifying the one port.

26. A method of administering a communication apparatus having a plurality of ports addressable by extension numbers, comprising the steps of:
establishing a communication connection to the system through an individual one of the ports; and
sending an extension number that is to be assigned to serve as an address of the one port via the communication connection to the system to cause the system to receive the sent extension number at the one port and to assign the extension number to the one port.

27. An apparatus comprising:
a plurality of communication ports each addressable by an extension number;
memory means for storing a plurality of translation tables each associated with and addressed by a different extension number and having an entry for identifying a port to which the associated extension number is presently assigned; and
means responsive to receipt of an extension number for an individual one of the ports, for causing the entry of the translation table associated with the received extension number to identify the one port.

28. The apparatus of claim 27 further comprising:
means responsive to receipt of a predetermined signal for an individual one of the ports having an assigned extension number, for causing the entry of the translation table associated with the assigned extension number to cease identifying a port.

29. The apparatus of claim 27 wherein
the entry-causing means include:
means responsive to a first signal received at an individual one of the ports, for determining whether the entry of any of the translation tables identifies the one port;

means responsive to a determination that the entry of none of the translation tables identifies the one port, for sending a second signal from the one port to elicit supplying of an extension number for the one port to the apparatus;

means responsive to receipt at the one port of an extension number elicited by the second signal, for determining whether a translation table is associated with the received extension number; and means responsive to a determination that a translation table is associated with the received extension number, for causing the entry of the translation table associated with the received extension number to identify the one port.

30. The apparatus of claim 29 wherein
the entry-causing means further include:
means responsive to the entry of the translation table being caused to identify the one port, for sending a third signal from the one port to confirm assignment of the received extension number to the one port.

31. The apparatus of claim 29 wherein
the means for sending second signal comprise:
means responsive to a determination that the entry of none of the translation tables identifies the one port, for sending a third signal from the one port to elicit supplying of a password to the apparatus;

means responsive to receipt of a password elicited by the third signal, for determining whether the received password is valid; and means responsive to a determination that the received password is valid, for sending the second signal from the one port to elicit supplying of an extension number for the one port to the apparatus.

32. The apparatus of claim 29 wherein
the entry-causing means further include:
means responsive to a determination that the entry of a translation table identifies the one port, for sending a third signal from the one port to elicit supplying of a response signal to the apparatus;

means responsive to receipt at the one port of the response signal, for determining whether the response signal is a predetermined signal; and means responsive to a determination that the response signal is the predetermined signal, for causing the entry of the translation table that identifies the one port to cease identifying the one port.

33. A method of assigning an extension number to a communication port of an apparatus having a plurality of communication ports each addressable by an extension number and a plurality of translation tables each associated with and addressed by a different extension number and having an entry for identifying a port to which the associated extension number is presently assigned, comprising the steps of:
receiving an extension number for an individual one of the ports; and
causing the entry of the translation table associated with the received extension number to identify the one port thereby to assign the received extension number as an address to the one port, in response to receiving the extension number.

34. The method of claim 33 further comprising the step of:

causing the entry of the translation table associated with the assigned extension number to cease identifying a port, in response to receipt of a predetermined signal for the one port having the assigned extension number.

35. The method of claim 33 wherein
the step of causing includes the steps of:

determining whether the entry of any of the translation tables identifies the one port, in response to a first signal received at the one port;

sending a second signal from the one port to elicit supplying of an extension number for the one port, in response to a determination that the entry of none of the translation tables identifies the one port;

determining whether a translation table is associated with an extension number elicited by the second signal, in response to receipt at the one port of the elicited extension number; and causing the entry of the translation table associated with the received extension number to identify the one port, in response to a determination that a translation table is associated with the received extension number.

36. The method of claim 35 wherein
the step of causing further includes the step of:
sending a third signal from the one port to confirm assignment of the received extension number to the one port, in response to the entry of the translation table being caused to identify the one port.

37. The method of claim 35 wherein
the step of sending a second signal comprises the steps of:

sending a third signal from the one port to elicit supplying of a password, in response to a determination that the entry of none of the translation tables identifies the one port;

determining whether a password elicited by the third signal is valid, in response to receipt of the elicited password; and sending the second signal from the one port to elicit supplying of an extension number for the one port, in response to a determination that the received password is valid.

38. The method of claim 35 wherein
the step of causing further includes the steps of:
sending a third signal from the one port to elicit supplying of a response signal, in response to a determination that the entry of a translation table identifies the one port;

determining whether an elicited response signal is a predetermined signal, in response to receipt at the one port of the elicited response signal; and causing the entry of the translation table that identifies the one port to cease identifying the one port, in response to a determination that the response signal is the predetermined signal.

39. A method of assigning an address to a communication port of an apparatus having a plurality of addressable communication ports, comprising the steps of:

determining whether an individual one of the ports has an address assigned thereto, in response to a first signal received at the one port;

sending a second signal from the one port to elicit supplying of an address for the one port, in response to a determination that the one port does not have an address assigned thereto;

assigning an address elicited by the second signal to the one port, in response to receipt at the one port of the elicited address;

sending a third signal from the one port to elicit supplying of a response signal, in response to a determination that the one port has an address assigned thereto;

determining whether the response signal is a predetermined signal, in response to receipt at the one port of the response signal; and freeing the address assigned to the one port from the assignment to the one port, in response to a determination that the response signal is the predetermined signal.

40. A method of assigning an address to a communication port of a communication switch having a plurality of addressable communication ports for interfacing communication lines to the switch, an arrangement for switching communications among the plurality of ports in response to communication destination addresses, and a memory for storing a plurality of translation tables each associated with a different address and having an entry for identifying a port to which the associated address is assigned, comprising the steps of:

determining whether the entry of any of the translation tables identifies an individual one of the ports, in response to a first signal received at the one port;

sending a second signal from the one port to elicit supplying of an address for the one port, in response to a determination that the entry of none of the translation tables identifies the one port;

determining whether a translation table is associated with an address elicited by the second signal, in response to receipt at the one port of the elicited address; and causing the entry of the translation table associated with the received address to identify the one port, in response to a determination that a translation table is associated with the received address.

41. The method of claim 40 wherein
the step of causing further includes the step of:
sending a third signal from the one port to confirm assignment of the received address to the one port, in response to the entry of the translation table being caused to identify the one port.

42. The method of claim 40 wherein
the step of sending a second signal comprises the steps of:

sending a third signal from the one port to elicit supplying of a password, in response to a determination that the entry of none of the translation tables identifies the one port;

determining whether a password elicited by the third signal is valid, in response to the receipt of the elicited password; and sending the second signal from the one port to elicit supplying of an address for the one port, in response to a determination that the received password is valid.

43. The method of claim 40 wherein
the step of causing further includes the steps of:
sending a third signal from the one port to elicit supplying of a response signal, in response to a determination that the entry of a translation table identifies the one port;

determining whether the response signal is a predetermined signal, in response to receipt at the one port of the response signal; and causing the entry of the translation table that identifies the one port to cease identifying the one port, in response to a determination that the received response signal is the predetermined signal.

* * * * *